(12) United States Patent
Bäcklund et al.

(10) Patent No.: US 11,278,818 B2
(45) Date of Patent: Mar. 22, 2022

(54) METHOD FOR APPLY GAMIFICATION TECHNIQUES TO A SECURITY SYSTEM

(71) Applicant: Irisity AB, Gothenburg (SE)

(72) Inventors: Marcus Bäcklund, Lidingö (SE); Victor Hagelbäck, Nödinge (SE)

(73) Assignee: Irisity AB, Gothenburg (SE)

( * ) Notice: Subject to any disclaimer, the term of this patent is extended or adjusted under 35 U.S.C. 154(b) by 138 days.

(21) Appl. No.: 16/625,833

(22) PCT Filed: Jun. 19, 2018

(86) PCT No.: PCT/SE2018/050652
§ 371 (c)(1),
(2) Date: Dec. 23, 2019

(87) PCT Pub. No.: WO2019/009780
PCT Pub. Date: Jan. 10, 2019

(65) Prior Publication Data
US 2021/0154586 A1    May 27, 2021

(30) Foreign Application Priority Data

Jul. 5, 2017    (SE) .................................... 1750885-4

(51) Int. Cl.
*A63F 13/798*    (2014.01)
*G08B 13/196*    (2006.01)

(52) U.S. Cl.
CPC ...... *A63F 13/798* (2014.09); *G08B 13/19682* (2013.01); *G08B 13/19684* (2013.01)

(58) Field of Classification Search
CPC ........ G08B 13/19682; G08B 13/19684; A63F 13/798
See application file for complete search history.

(56) References Cited

U.S. PATENT DOCUMENTS

| | | | |
|---|---|---|---|
| 8,079,596 B1* | 12/2011 | Shoemaker, Jr. | ... G07F 17/3297 273/447 |
| 9,500,425 B1* | 11/2016 | Lawrence | ................ F41A 17/08 |
| 2001/0003099 A1* | 6/2001 | Von Kohorn | .......... H04H 20/38 463/40 |
| 2007/0066403 A1* | 3/2007 | Conkwright | .......... A63F 13/803 463/43 |
| 2007/0190495 A1* | 8/2007 | Kendir | .................... F41A 33/02 434/21 |

(Continued)

FOREIGN PATENT DOCUMENTS

| | | |
|---|---|---|
| JP | 2008140340 A | 6/2008 |
| WO | 2006102369 A2 | 9/2006 |

OTHER PUBLICATIONS

Extended European Search Report dated Feb. 17, 2021 for European Application No. 18827952.5, 6 pages.

(Continued)

*Primary Examiner* — Reginald A Renwick
(74) *Attorney, Agent, or Firm* — RMCK Law Group, PLC

(57) ABSTRACT

The present disclosure relates to a computer implemented method for apply gamification techniques to a security system, allowing scoring of users handling events generated within the security system. The present disclosure also relates to a corresponding security system and a computer program product.

20 Claims, 2 Drawing Sheets

(56) References Cited

U.S. PATENT DOCUMENTS

2007/0281285 A1* 12/2007 Jayaweera ............... G09B 7/02
                                                        434/156
2008/0244605 A1   10/2008 Bennington et al.
2016/0140478 A1    5/2016 Hambrick et al.
2017/0046794 A1    2/2017 Shukla et al.
2017/0140660 A1*   5/2017 Morton ................... H04L 67/38

OTHER PUBLICATIONS

International Search Report and Written Opinion for International Application No. PCT/SE2018/050652 dated Oct. 2, 2018, 14 pages.

* cited by examiner

METHOD FOR APPLY GAMIFICATION TECHNIQUES TO A SECURITY SYSTEM

CROSS-REFERENCE TO RELATED APPLICATIONS

This application is a 371 U.S. National Stage of International Application No. PCT/SE2018/050652, filed Jun. 19, 2018, which claims priority to Swedish Patent Application No. 1750885-4, filed Jul. 5, 2017. The disclosures of each of the above applications are incorporated herein by reference in their entirety.

TECHNICAL FIELD

The present disclosure relates to a computer implemented method for apply gamification techniques to a security system, allowing scoring of users handling events generated within the security system. The present disclosure also relates to a corresponding security system and a computer program product.

BACKGROUND

In a conventional security system, a plurality of security devices, such as security cameras, are typically used for monitoring and security of different locations of interest, sometimes denoted as security sites, where the video streams generated by the plurality of cameras are summoned to a human operator for deciding if any abnormalities exist. In some instances, the security system may additionally comprise a computer system performing video processing of the video streams, such that the human operator only needs to be involved if the computer system automatically has decided that an abnormality is present, e.g. a possible alarm condition that needs interaction by the human operator. A security system may also comprise further security devices, such as motion detectors (e.g. PIR), magnetic contacts, passage control arrangements, etc.

With an increasing interest in the positive effects following the application and use of a security system, such as a reduced risk of sabotage and/or break-in, the security market is greatly expanding. However, with an increasing number security sites follows the need to engage a large staff, including e.g. installation technicians, operators, security guards, etc. With this in mind, it would be desirable to adapt the security system to promote a proactive behavior of the security staff with the purpose of increasing staff efficiency.

SUMMARY

According to an aspect of the present disclosure, the above is at least partly met by a computer implemented method performed by a security system, the security system adapted to apply gamification techniques to a security service provided by the security system, wherein the security system comprises a first computing device having a graphical user interface (GUI) adapted to be handled by a first user, the first user being assigned a user skill level, and a server connected to the first computing device over a network, wherein the server implements a gamification environment to process a plurality of security service events, wherein the method comprises the steps of receiving, at the server, a notification of at least one security service event, determining, from the notification, a task to be performed to handle the at least one security service event, wherein the task is associated with a task skill level, assigning, at the server, the task to the first user, presenting, using the GUI of the first computing device, the task to be performed by the first user, receiving, at the server, feedback information relating to completion of the task, and determining, at the server, a score of performance of the task for the first user based on the task, the task skill level and the user skill level.

By means of the present disclosure, there is provided an automated procedure for scoring how well a user handles a security service event that has been assigned to that user, where the security service event has been generated by the security system. The user scoring will in accordance to the present disclosure be dependent on all of an indication of the type of task, an expectation of how "complicated" the security service event is to handle (i.e. the task skill level), and an expectation of how skilled the user is (i.e. the user skill level). Advantageously, the scoring may be allowed to be dynamically implemented, meaning that in case e.g. a user with an in comparison low skill level is handling a security service event that is considered in comparison complicated, then this user will be given a higher score as compared to if the same (type of) security service event was handled by a user having an in comparison higher skill level.

Thus, in accordance to the present disclosure it is possible to determine individual scoring of different users handling tasks associated with the security system, where the users are each provided with an individual computing device having a graphical user interface (GUI). This functionality may advantageously be used by the security system for comparing different user with each other, possibly forming "score boards" for the different users.

In accordance to the present disclosure, the computing device(s) are connected to a server using a network connection, such as the Internet. The server may in turn be connected to e.g. a plurality of security devices as discussed above. The security service events as defined above may for example be generated in case one of the security devices provides an indication that a security service event is taking place, such as that a security breach is indicated. It should however be understood that other functionalities provided by the security system equally may generate a security service event, such as for example relating to a request to add a further component (such as a further security device) to the security system. In a preferred embodiment at least one computing device (e.g. the first computing device) is mobile.

The GUI provided at the computing device may in accordance to the present disclosure be adapted to present the task assigned to the user, possibly being an indication of the security service event to be handled by the user. The GUI may also be configured to allow the user to indicate when and how the task has been completed, whereby information relating to the completion of the task is further provided to the server. Alternatively or also, the security system (e.g. the server or one of the security devices comprised with the security system, or the computing device) may automatically determine information relating to the completion of the task having been assigned to the user.

Once the scoring for the task has been determined (in a manner as discussed above), the GUI may further present the server determined scoring to the user. Accordingly, the users may fairly quickly get individual "feedback" relating to how well the task was completed. The GUI may additionally present an accumulated scoring for the user, possibly also allowing for presentation of a comparison between the user and other users (e.g. in the form of the above mentioned score board).

The scoring determined for the completed task may in one embodiment of the present disclosure be used for allowing the user to be assigned to a different skill level. Accordingly, the scoring determined for the completion of the task may possibly be compared to a predetermined threshold, where the user skill level for the user may be based on a result of the comparison. Thus, in case the scoring indicates that the user performed well (above expectation), then the user skill level may be increased. Correspondingly, in case the scoring indicates that the user performed somewhat badly (below expectation), then the user skill level may be decreased. The possibly updated user skill level may be presented to the user using the GUI.

In a possible embodiment of the present disclosure, the step of assigning the task to the first user is dependent on the user skill level. Accordingly, some tasks may only be assigned to a user having a certain skill level. As such, there may in accordance to the present disclosure be possible to "form" a user drive to perform well for increasing the user skill level, whereby possibly further tasks may be assigned to the user. Correspondingly, some tasks may only be assigned to users having a low user skill level (e.g. a novice user), where such tasks may be considered to be well suited for novice users, e.g. during training of such a novice user.

The determination of the score of performance/scoring may at least partly be dependent on an amount of time elapsed between presenting the task at the GUI of the first computing device and receiving the feedback information at the server. Accordingly, in case the user is "quick" in responding and handling the task it may be possible to achieve a higher scoring as compared to the case where the user is "slow" in responding and handling the task. Again, this will proactively direct the user to quickly handle the assigned task.

At the same time, a quality measure may in accordance to the present disclosure be implemented and used in the determination of the scoring. Such a quality measure may for example be formed in a peer review manner, e.g. by allowing the determination of the score of performance to be at least partly dependent on a user rating received at the server, where the user rating is provided by another user, such as by at least one of an end user and an expert operator of the security system.

The determination of the scoring may also be dependent on what type of information the (first) user is collecting when handling the task. As an example, the GUI of the first computing device may in one embodiment be configured to allow the user to input different type of information when handling the task. Such information may for example comprise geographical information (e.g. map data) relating to the user when handling the task. That is, the handling of the task may possibly be geographically related, such as for example when a security operator is handling an incident formed by e.g. one of the above mentioned security devices. In such a case the security operator may be assigned to visit a geographical location of the security device. The GUI may thus on one embodiment comprise a geolocation arrangement, such as a GPS receiver. Information from the GPS received may be provided as the above mentioned feedback information provided to the server.

The GUI may further be adapted to allow for the collection of e.g. an image or a video sequence relating to the handling of the task, where the image/video is provided as part of the feedback information. An in comparison large amount of collected information may have a positive effect when determining the scoring for the task. Such an image/video sequence should be selected to improve the subsequent handling of e.g. an incident and may comprise information useful in later filing of an insurance claim relating to the incident.

In accordance to the present disclosure, the method further comprises receiving, through the GUI, consent from the first user to participate in gamification. Accordingly, only users that have provided their consent to participation will proceed through the scoring process as defined above. It should however be understood that user not providing their consent may have limited possibility in increasing their user skill level, whereby possibly only a limited amount of tasks may be assigned to such users.

In a possible embodiment of the present disclosure the security service event is an at least partly fabricated security service event. That is, the methodology as presented in line with the present disclosure may possibly be used for "training" of a user of the security system. Specifically, the server may for example generate tasks/security service event that will spark an action by the user. However, the security service event may not necessarily be related to e.g. a break-in or similar. Rather, the user may be "tested" for determining how well the user is equipped for handling a specific task.

Possibly, the at least partly fabricated security service event is based on a previously recorded security service event. Accordingly, rather than "creating" a fabricated security service event from "scratch" (to be used as training material), the fabricated security service event to be presented to the user may be based on previous information collected when another user was handling such a task. The training may in accordance to the present disclosure take place for training novice users. However, also more skilled or expert users may be trained or tested using this embodiment.

According to another aspect of the present disclosure there is provided a security system adapted to apply gamification techniques to a security service provided by the security system, wherein the security system comprises a first computing device having a graphical user interface (GUI) adapted to be handled by a first user, the first user being assigned a user skill level, and a server connected to the first computing device over a network, wherein the server implements a gamification environment to process a plurality of security service events, wherein security system is configured to receive, at the server, a notification of at least one security service event, determine, from the notification, a task to be performed to handle the at least one security service event, wherein the task is associated with a task skill level, assign, at the server, the task to the first user, present, using the GUI of the first computing device, the task to be performed by the first user, receive, at the server, feedback information relating to completion of the task, and determine, at the server, a score of performance of the task for the first user based on the task, the task skill level and the user skill level. This aspect of the present disclosure provides similar advantages as discussed above in relation to the previous aspect of the present disclosure.

According to a still further aspect of the present disclosure there is provided a computer program product comprising a non-transitory computer readable medium having stored thereon computer program means for operating a security system adapted to apply gamification techniques to a security service provided by the security system, wherein the security system comprises a first computing device having a graphical user interface (GUI) adapted to be handled by a first user, the first user being assigned a user skill level, and a server connected to the first computing device over a network, wherein the server implements a gamification, wherein the computer program product comprises code for receiving, at the server, a notification of at least one security service event, code for determining, from the notification, a task to be performed to handle the at least one security service event, wherein the task is associated with a task skill level, code for assigning, at the server, the task to the first user, code for presenting, using the GUI of the first computing device, the task to be performed by the first user, code for receiving, at the server, feedback information relating to completion of the task, and code for determining, at the server, a score of performance of the task for the first user based on the task, the task skill level and the user skill level. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
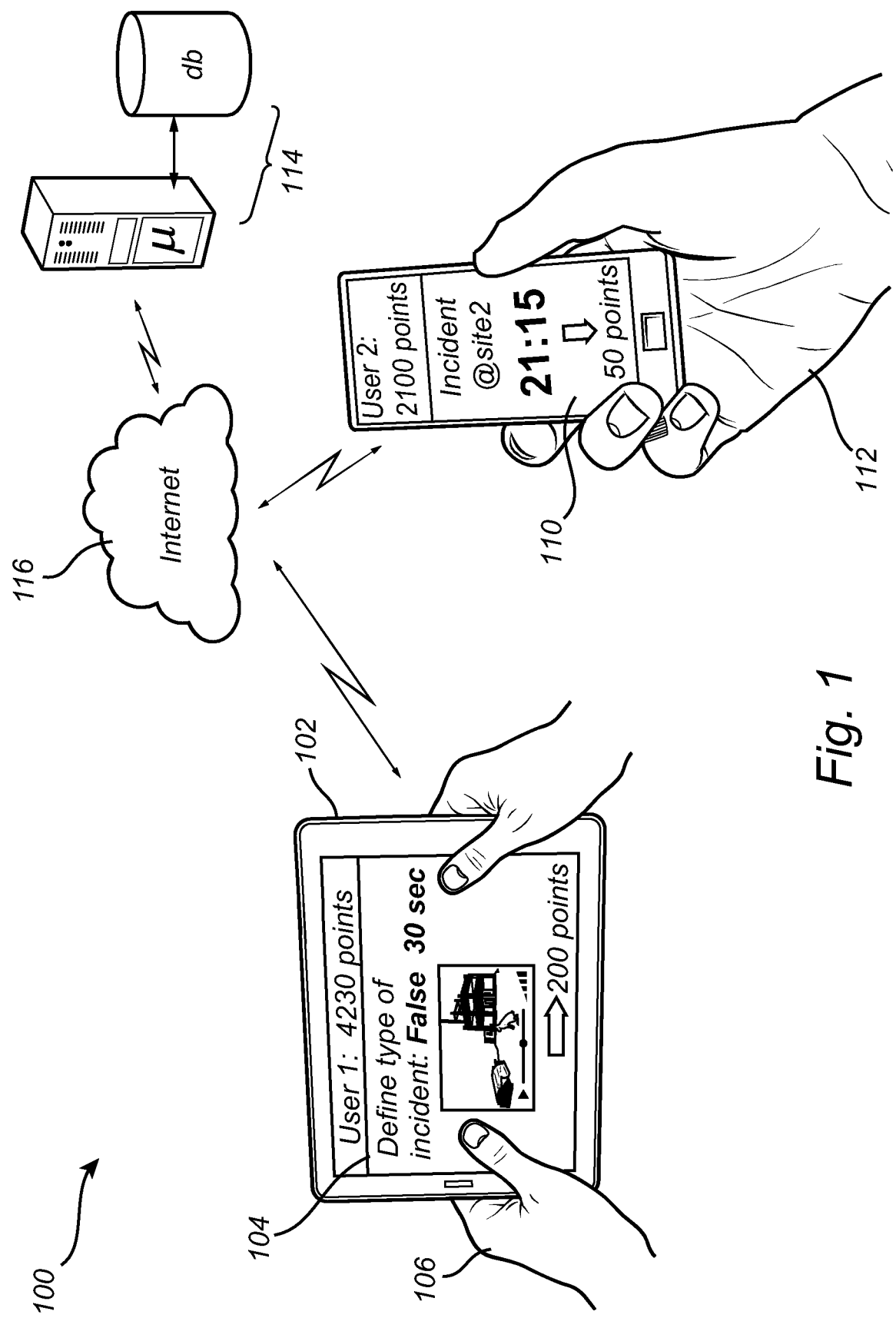
FIG. 1 illustrates a security system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and to FIG. 1 in particular, there is depicted a security system 100 according to a possible embodiment of the present disclosure. The security system 100 comprises a first mobile computing device 102 having a graphical user interface (GUI) 104 adapted to be handled by a first user 106, a second mobile computing device 108 having a GUI 110 adapted to be handled by a second user 112, and a server/database 114 connected to the first 102 and the second 108 mobile computing device over a network 116, such as the Internet. The first 102 and the second 108 mobile computing devices may for example be a laptop computer, a mobile phone, a tablet, etc. It should however be understood that at least one of the computing devices may be stationary, e.g. provided as a desktop computer.

The network 116 may be in part be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar.

The server 114 may in one embodiment be a cloud-based server. Thus, the computing power provided by means of the present disclosure may be distributed between a plurality of servers, and the location of the servers must not be explicitly defined. Advantageous following the use of a cloud-based solution is also the inherent redundancy achieved.

As illustrated in FIG. 1, the GUI 104 of the first user mobile computing device 102 is exemplified to present a video sequence that has been generated by a security camera (not shown) forming part of the security system 100 and adapted to monitor a first security site. The server 114 receives the image data from the security camera as a notification of a security service event. The server 114 in turn determines a task based on the image data (security service event), in the exemplified case that a user is needed for manual (or semi-manual) determination of if the image data shows a "true" or a "false" alarm. In FIG. 1, the task assigned to the first user 106 operating the first mobile computing device 102 is consequently to determine if there is a true or false alarm.

The GUI 104 will accordingly be adapted based on the task, for presenting the image data to the first user 106. The GUI 104 is further provided with means for allowing the user to provide feedback in relation to the manual/semi-manual analysis of the image data. In the present case, the first user 106 determines that the alarm is a false alarm and provides this as feedback to the server 114.

The server 114 receives the feedback information from the user ("false alarm") and also determined the time it took for the first user 106 to provide the feedback information. In the exemplified embodiment the duration for reviewing and responding was determined to be 30 seconds. Based on the task (in this case reviewing image data), the task skill level (in this case reviewing image data captured during the day, considered less complicated as compared to reviewing image data captured during the evening/night) and the user skill level, it is possible for the server 114 to determine a score of performance for the task (i.e. reviewing image data) handled by the first user 106. In the illustration presented in FIG. 1, the first user is given 200 points. The GUI 104 further shows that an accumulated scoring for the first user 106 is 4230 points.

As is further presented in FIG. 1, the GUI 110 of the second mobile computing device 108 operated by the second user 112 presents in a corresponding manner a task to be handled by the second user 112. In this case a security device (not shown) arranged at a second site provides an indication of a security service event, such as a security breach. The second user 112, being a security guard, is assigned the task to visit the second site to handle the security breach. In the illustration provided in FIG. 1, the second user 112 is slower to respond and act on the assigned task than what may be expected. The time it took for the second user 112 to handle the task is exemplified as 21 minutes and 51 seconds. Based on the task, the task skill level and the user skill level the second user was only given 50 points for handling the task. The GUI 110 shows an accumulated scoring to the second user 112 as 2100 points.

Accordingly, in comparing the scores for the first 106 and the second 112 users, it may automatically be concluded that the first user 106 is performing "better" as compared to the second user 112. Thus, in moving forward the second user may need to be trained further or otherwise be given feedback to improve his performance. Conversely, the first user 106 may be given, in comparison, more complicated tasks to be handled.

The accumulated scoring to the users 106, 112 may further be used for remuneration. That is, in case a user is receiving an average scoring per e.g. day he may be given a monitory bonus. Additionally, when a user has reached an accumulated scoring (points) above a predetermined threshold, he may possibly be promoted.

As understood, in a resource demanding environment, such as in relation to staffing of an operators/user assigned to tasks of a security system, the present disclosure may allow for automatic handling of promotion and remuneration/bonuses, with the purpose of increasing staff productivity.

Figure 2:
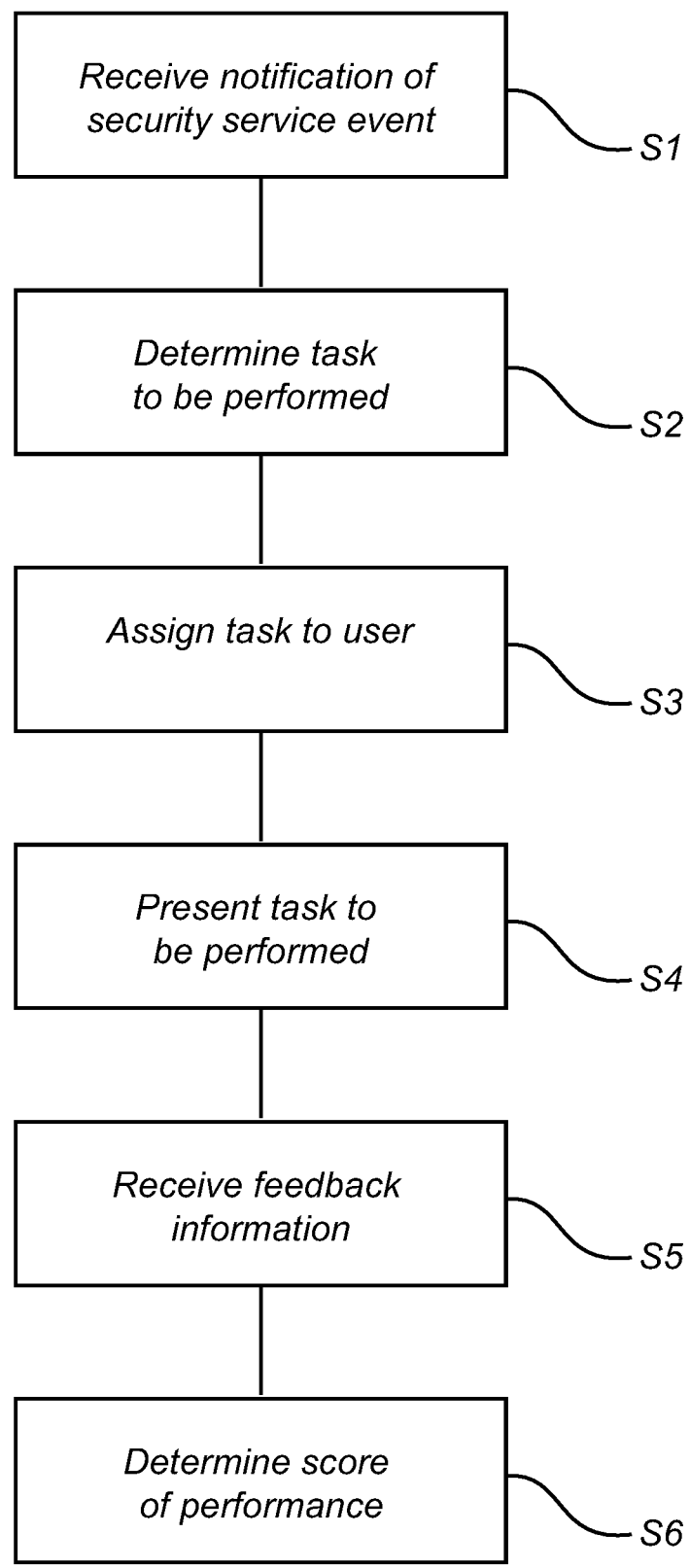
FIG. 2 shows a flow chart of a method according to an embodiment of the present disclosure.

In summary and with further reference to FIG. 2, the present disclosure relates to a computer implemented method performed by a security system 100, the security system 100 adapted to apply gamification techniques to a security service provided by the security system 100, wherein the security system 100 comprises a first mobile computing device 102 having a graphical user interface (GUI) 104 adapted to be handled by a first user 106, the first user 106 being assigned a user skill level, and a server 114 connected to the first mobile computing device 102 over a network 116, wherein the server 114 implements a gamification environment to process a plurality of security service events, wherein the method comprises the steps of receiving, S1, at the server 114, a notification of at least one security service event, determining, S2, from the notification, a task to be performed to handle the at least one security service event, wherein the task is associated with a task skill level, assigning, S3, at the server 114, the task to the first user 106, presenting, S4, using the GUI of the first mobile computing device 102, the task to be performed by the first user 102, receiving, S5, at the server 114, feedback information relating to completion of the task, and determining, S6, at the server 114, a score of performance of the task for the first user 106 based on the task, the task skill level and the user skill level.

By means of the present disclosure, it is possible to determine individual scoring of different users handling tasks associated with the security system. This functionality may advantageously be used by the security system for comparing different user with each other, possibly forming "score boards" for the different users.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method performed by a security system, the security system adapted to apply gamification techniques to a security service provided by the security system, wherein the security system comprises:
   a first computing device having a graphical user interface (GUI) adapted to be handled by a first user, the first user being assigned a user skill level,
   one or more security cameras arranged at a security site, and
   a server connected to the first computing device and the one or more security cameras over a network, wherein the server implements a gamification environment to process a plurality of security service events,
   wherein the method comprises:

receiving, at the server, a notification of at least one security service event, the notification comprising image data obtained from the one or more security cameras and corresponding to the security site;

determining, based on the image data comprised with the notification, a task to be performed to handle the at least one security service event, wherein the task is associated with a task skill level;

assigning, at the server, the task to the first user;

presenting, using the GUI of the first computing device, the task to be performed by the first user;

receiving, at the server, feedback information relating to completion of the task, and determining, at the server, a score of performance of the task for the first user based on the task, the task skill level and the user skill level.

2. The method according to claim 1, further comprising:
presenting, using the GUI of the first computing device, the score of performance of the task for the first user.

3. The method according to claim 1, further comprising:
comparing, at the server, the score of performance of the task for the first user with a predetermined threshold, and
adjusting the user skill level for the first user based on a result of the comparison.

4. The method according to claim 3, further comprising:
presenting, using the GUI of the first computing device, the adjusted user skill level.

5. The method according to claim 1, wherein assigning the task to the first user is dependent on the user skill level.

6. The method according to claim 1, wherein determining the score of performance is at least partly dependent on an amount of time elapsed between presenting the task at GUI of the first computing device and receiving the feedback information.

7. The method according to claim 1, wherein determining the score of performance is at least partly dependent on a user rating received at the server.

8. The method according to claim 7, wherein the user rating is provided by at least one of an end user and an expert operator of the security system.

9. The method according to claim 1, further comprising:
receiving, through the GUI, consent from the first user to participate in gamification.

10. The method according to claim 1, wherein the feedback information is received from a security device comprised with the security system, wherein the security device is configured to carry out predetermined security task.

11. The method according to claim 1, wherein the security service event is an at least partly fabricated security service event.

12. The method according to claim 11, wherein the at least partly fabricated security service event is based on a previously recorded security service event.

13. The method according to claim 1, wherein the feedback information is received from the first computing device.

14. The method according to claim 13, wherein the feedback information comprises an image or a video sequence relating to task.

15. A security system adapted to apply gamification techniques to a security service provided by the security system, wherein the security system comprises:
a first computing device having a graphical user interface (GUI) adapted to be handled by a first user, the first user being assigned a user skill level,
one or more security cameras arranged at a security site, and
a server connected to the first computing device and the one or more security cameras over a network, wherein the server implements a gamification environment to process a plurality of security service events,
wherein security system is configured to:
receive, at the server, a notification of at least one security service event, the notification comprising image data obtained from the one or more security cameras and corresponding to the security site;
determine, from based on the image data comprised with the notification, a task to be performed to handle the at least one security service event, wherein the task is associated with a task skill level;
assign, at the server, the task to the first user;
present, using the GUI of the first computing device, the task to be performed by the first user;
receive, at the server, feedback information relating to completion of the task, and
determine, at the server, a score of performance of the task for the first user based on the task, the task skill level and the user skill level.

16. The security system according to claim 15, wherein the feedback information is received from the first computing device.

17. The security system according to claim 16, wherein the feedback information comprises an image or a video sequence relating to task.

18. A computer program product comprising a non-transitory computer readable medium having stored thereon computer program means for operating a security system adapted to apply gamification techniques to a security service provided by the security system, wherein the security system comprises:
a first computing device having a graphical user interface (GUI) adapted to be handled by a first user, the first user being assigned a user skill level,
one or more security cameras arranged at a security site, and
a server connected to the first computing device and the one or more security cameras over a network, wherein the server implements a gamification environment to process a plurality of security service events,
wherein the computer program product comprises:
code for receiving, at the server, a notification of at least one security service event, the notification comprising image data obtained from the one or more security cameras and corresponding to the security site;
code for determining, from based on the image data comprised with the notification, a task to be performed to handle the at least one security service event, wherein the task is associated with a task skill level;
code for assigning, at the server, the task to the first user;
code for presenting, using the GUI of the first computing device, the task to be performed by the first user;
code for receiving, at the server, feedback information relating to completion of the task, and
code for determining, at the server, a score of performance of the task for the first user based on the task, the task skill level and the user skill level.

19. The computer program product according to claim 18, wherein the feedback information is received from the first computing device.

20. The computer program product according to claim 19, wherein the feedback information comprises an image or a video sequence relating to task.

* * * * *